Patented Aug. 14, 1928.

1,681,156

UNITED STATES PATENT OFFICE.

ISADORE SIDNEY MELLANOFF, OF PHILADELPHIA, PENNSYLVANIA, ASSIGNOR TO KEMIKAL INC., A CORPORATION OF DELAWARE.

PROCESS OF MANUFACTURING OXYGEN CONTAINING COMPOUNDS OF THE ALIPHATIC SERIES.

No Drawing. Application filed March 13, 1928. Serial No. 261,415.

My invention relates more particularly to the production of aliphatic acids, including oxalic acid, formic acid, acetic acid, and homologues of the saturated monobasic acid series. The particular phase of the process producing those acids to which my invention relates is the production of the salts from which the acids may be derived by any process, many of which are well known and standardized. The salts most easily treated are those of the alkali metals or the alkali earths, and I prefer to work toward the production of those salts. The base material heretofore employed for the production of these salts has generally been sawdust or wood or some such untreated natural product as a moss or other vegetable matter. I find, however, that there are other materials containing or largely made up of carbohydrate which are suitable for my treatment, such as paper pulp, paper, rags, straw, and other waste materials. Good results may be obtained by starting with a base containing a substance in which the carbohydrate molecule has been altered or changed.

Any of these base materials may be treated with an alkaline solution which may be made up of an oxide or a hydroxide of an alkaline earth or an alkali metal or a mixture of two or more in water. The action of this alkaline solution on the carbohydrate is in the nature of an oxidizing process and in order to augment or aid the oxidizing action, I prefer to supply air to the mixture while the conversion is going on. Preferably the air is supplied by forcing it in one or many streams through the material. A convenient way of doing this, may be by injecting the air through a plurality of orifices arranged at or near the bottom of the vessel containing the mass. The air thus provided will agitate and thoroughly mix the mass and at the same time afford intimate contact between the air and the material being treated. In order to assist the chemical reaction, the mass should be heated by any suitable means throughout the process.

The action of the process is assisted and an improved result obtained if a heavier hydrocarbon oil, or paraffin is present in the mass during the reaction. The oil or paraffin may allow a more intimate mixture of the elements of the mass and seems to act as a catalyst agent, being itself substantially inert, its molecules not materially entering into the chemical reaction which produces the desired salt. The heat applied to the mass may, to some extent, tend to break down the hydrocarbon catalyst, and the elements thus freed may enter into the process but this chemical effect of the hydrocarbon is slight and almost negligible.

The details of the process may vary within wide limits, depending upon numerous conditions or attendant circumstances which will be readily perceived by one familiar with the art. Without intending to limit, in any way, the invention or its application, one specific way of operating may be given for illustrative purposes.

Waste newspapers may be collected and in any suitable way reduced, more or less, to a pulp which will, in ordinary course, contain some water. 100 parts, by weight, of an alkali such as sodium hydroxide may be added to 300 parts, by weight, of water. To this solution may be added sufficient paper pulp to equal 30 parts, by weight, of the dry paper. Heat is applied to the mixture so as to gradually raise the temperature to about 200° C. Throughout this heating, I prefer to pump air in finely divided streams into the bottom of the mass so that the air will rise through the mass and become intimately mixed with it while agitating it. This heating and aerating process is continued until most of the moisture has been eliminated. During this time some sodium oxalate will be formed as well as sodium salts of the other aliphatic acids, but a considerable portion of the carbohydrates in the paper remain unconverted. There then may be added to the mixture 1 to 2 parts, by weight, of a heavy hydrocarbon such as paraffin. The heating is then gradually increased to 210° C. the injection of air continuing as the heat is raised. In this phase of the process I find a very much increased absorption by the mass of the ingoing air and a very much increased production of sodium oxalate. The mass preferably will be held at about 210° C., while air is pumped through it for a period of approximately 4 hours. Preferably then the air is shut off and the temperature of the mass gradually reduced during a period of about 6 hours, at the end of which time the temperature will preferably be down to about 150° C. The mass is then allowed to cool, and contains the salts of the aliphatic acids which may be extracted and treated by any of the processes well known in the art.

It should be understood that the precise conditions, set forth, are intended to be illustrative and not limiting. It is not necessary to employ the exact relative amounts of waste paper, nor to use that specific base, nor are the specific amounts of kind or alkalies essential. Likewise the temperatures and times specified may be varied. The process need not result in the production of a single salt of a single acid. The proportions and character of the ingredients and the application of heat and the air may be considerably varied, depending upon the result sought since appropriate modifications will suggest themselves to those skilled in the art.

By varying the temperatures to which the substance is exposed, the character of the product may be varied. It is desired, of course, not to raise the temperature to such a high point that the material will be carbonized, but within that limit, in general, the higher the temperature, the nearer will the resulting product be all oxalate. With lower temperatures varying quantities of salts of the monobasic acids may be produced. The quantity and character of the product, likewise, may be determined by varying the air input or by varying the length of time during which the material is treated. These adjustments will be readily understood by those skilled in the art.

I claim as my invention:

1. The process of manufacturing oxygen containing compounds of the aliphatic series consisting in heating carbohydrates with alkali in intimate contact with air then adding a heavy hydrocarbon and increasing the temperature to about 210° C., and subsequently shutting off the supply of air and decreasing the temperature to about 150° C.

2. The process of manufacturing oxygen containing compounds of the alphatic series consisting in heating carbohydrates with alkali and air, then adding a heavy hydrocarbon and increasing the temperature to about 210° C., and maintaining this temperature for about 4 hours, and subsequently shutting off the supply of air and decreasing the temperature to about 150° C. and maintaining this temperature for about 6 hours.

3. The process of manufacturing salts of aliphatic acids consisting in heating carbohydrates with alkali then adding a heavy hydrocarbon and increasing the temperature to about 210° C., and subsequently decreasing the temperature to about 150° C.

4. The process of manufacturing an oxalate consisting in heating carbohydrates with alkali in intimate contact with air, then adding a heavy hydrocarbon and increasing the temperature to about 210° C., and subsequently shutting off the supply of air and decreasing the temperature to about 150° C.

5. The process of manufacturing oxalates consisting in heating paper with alkali and air, then adding a heavy hydrocarbon and increasing the temperature to about 210° C, and maintaining this temperature for about 4 hours, and subsequently shutting off the supply of air and decreasing the temperature to about 150° C.

6. The process of manufacturing sodium oxalate consisting in heating paper with caustic soda and air, then adding a heavy hydrocarbon and increasing the temperature to about 210°, and subsequently shutting off the supply of air and decreasing the temperature to about 150° C.

7. The step in the process of manufacturing oxygen containing compounds of the aliphatic series consisting in heating carbohydrates with alkali in intimate contact with air and a heavy hydrocarbon which remains in the mass as a catalyst.

8. The step in the process of manufacturing salts of aliphatic acids consisting in heating carbohydrates with alkali in intimate contact with air and a heavy hydrocarbon which remains in the mass as a catalyst.

9. The step in the process of manufacturing oxalates consisting in heating paper with alkali in intimate contact with air and a heavy hydrocarbon which remains in the mass as a catalyst.

10. The step in the process of manufacturing oxygen containing compounds of the aliphatic series consisting in heating to about 210° C. carbohydrates with alkali in intimate contact with air and a heavy hydrocarbon which remains in the mass as a catalyst.

11. The step in the process of manufacturing salts of aliphatic acids consisting in heating to about 210° C. carbohydrates with alkali in intimate contact with air and a heavy hydrocarbon which remains in the mass as a catalyst.

12. The step in the process of manufacturing oxalates consisting in heating to about 210° C. paper with alkali in intimate contact with air and a heavy hydrocarbon which remains in the mass as a catalyst.

13. The step in the process of manufacturing oxygen containing compounds of the aliphatic series consisting in heating to about 210° C. carbohydrates with alkali in intimate contact with air and a heavy hydrocarbon.

14. The step in the process of manufacturing oxalates consisting in heating to about 210° C. carbohydrates with alkali in intimate contact with air and a heavy hydrocarbon.

15. The step in the process of manufacturing salts of aliphatic acids consisting in heating to about 210° C. paper with alkali in intimate contact with air and a heavy hydrocarbon.

16. The step in the process of manufacturing salts of aliphatic acids consisting in heating carbohydrates with an alkali and air, then adding a heavy hydrocarbon and increasing the temperature to about 210° C.

ISADORE SIDNEY MELLANOFF.